United States Patent
Hagen et al.

(10) Patent No.: US 8,384,759 B2
(45) Date of Patent: Feb. 26, 2013

(54) VIDEO CONFERENCING APPARATUS AND METHOD FOR CONFIGURING A COMMUNICATION SESSION

(75) Inventors: Einar Andreas Hustadnes Hagen, Oslo (NO); Sean Furey, Langley (GB)

(73) Assignee: Cisco Technology, Inc., San Jose, CA (US)

( * ) Notice: Subject to any disclaimer, the term of this patent is extended or adjusted under 35 U.S.C. 154(b) by 565 days.

(21) Appl. No.: 12/636,514

(22) Filed: Dec. 11, 2009

(65) Prior Publication Data

US 2010/0149309 A1 Jun. 17, 2010

Related U.S. Application Data

(60) Provisional application No. 61/122,155, filed on Dec. 12, 2008.

(30) Foreign Application Priority Data

Dec. 12, 2008 (NO) .................................. 20085194

(51) Int. Cl.
H04N 7/15 (2006.01)
H04B 3/20 (2006.01)
G06F 9/46 (2006.01)
H04L 12/28 (2006.01)

(52) U.S. Cl. ... 348/14.12; 345/7; 348/14.03; 348/14.08; 348/14.09; 348/569; 370/351; 370/352; 375/240.01; 375/240.27; 381/66; 709/204; 709/217; 709/228; 709/230; 725/106; 725/122; 725/135

(58) Field of Classification Search ... 345/7; 348/14.03, 348/14.08, 14.09, 14.12, 569; 370/351, 352; 375/240.01, 240.27; 381/66; 709/204, 217, 709/228, 230; 725/106, 122, 135
See application file for complete search history.

(56) References Cited

U.S. PATENT DOCUMENTS

| | | | | |
|---|---|---|---|---|
| 5,674,003 A | * | 10/1997 | Andersen et al. | 709/228 |
| 5,828,839 A | * | 10/1998 | Moncreiff | 709/204 |
| 5,959,667 A | | 9/1999 | Maeng | |
| 5,978,043 A | * | 11/1999 | Blonstein et al. | 348/569 |
| 5,978,835 A | * | 11/1999 | Ludwig et al. | 709/204 |
| 6,012,094 A | * | 1/2000 | Leymann et al. | 709/230 |
| 6,112,233 A | * | 8/2000 | Xu | 709/217 |
| 6,138,144 A | * | 10/2000 | DeSimone et al. | 709/204 |
| 6,754,277 B1 | * | 6/2004 | Heinzelman et al. | 375/240.27 |
| 6,772,436 B1 | * | 8/2004 | Doganata et al. | 725/106 |
| 7,376,129 B2 | * | 5/2008 | Acharya et al. | 370/352 |
| 7,522,577 B2 | * | 4/2009 | Hiim et al. | 370/351 |

(Continued)

FOREIGN PATENT DOCUMENTS

| | | |
|---|---|---|
| EP | 1 936 547 A1 | 6/2008 |
| WO | WO 96/26587 A1 | 8/1996 |

(Continued)

OTHER PUBLICATIONS

Extended European Search Report issued May 7, 2012, in European Patent Application No. 09832171.4.

(Continued)

*Primary Examiner* — Gerald Gauthier
(74) *Attorney, Agent, or Firm* — Oblon, Spivak, McClelland, Maier & Neustadt, L.L.P.

(57) ABSTRACT

A method of setting up communication sessions in a telepresence call including a multiple point-to-point connections between at least two telepresence systems, wherein the information required for setting up the communication sessions is embedded in a control protocol message flow establishing a first communication session between the two telepresence systems.

12 Claims, 6 Drawing Sheets

U.S. PATENT DOCUMENTS

| | | | |
|---|---|---|---|
| 7,716,283 B2 * | 5/2010 | Thukral | 709/204 |
| 8,150,052 B2 * | 4/2012 | Gygax et al. | 381/66 |
| 2002/0023133 A1 * | 2/2002 | Kato et al. | 709/205 |
| 2003/0067536 A1 | 4/2003 | Boulanger et al. | |
| 2003/0193559 A1 * | 10/2003 | Fernandez et al. | 348/14.08 |
| 2004/0181811 A1 * | 9/2004 | Rakib | 725/122 |
| 2004/0231003 A1 * | 11/2004 | Cooper et al. | 725/135 |
| 2005/0060368 A1 * | 3/2005 | Wang et al. | 709/204 |
| 2006/0092269 A1 | 5/2006 | Baird et al. | |
| 2008/0162076 A1 | 7/2008 | Kondo et al. | |
| 2008/0246834 A1 * | 10/2008 | Lunde et al. | 348/14.09 |
| 2008/0267283 A1 * | 10/2008 | Smith et al. | 375/240.01 |
| 2009/0146915 A1 * | 6/2009 | Marathe | 345/7 |
| 2009/0164575 A1 | 6/2009 | Barbeau et al. | |
| 2009/0207233 A1 * | 8/2009 | Mauchly et al. | 348/14.09 |
| 2009/0207234 A1 * | 8/2009 | Chen et al. | 348/14.09 |
| 2010/0073454 A1 * | 3/2010 | Lovhaugen et al. | 348/14.03 |
| 2010/0149309 A1 * | 6/2010 | Hagen et al. | 348/14.12 |
| 2010/0157017 A1 * | 6/2010 | Pepperell | 348/14.09 |
| 2011/0211037 A1 * | 9/2011 | Gygax et al. | 348/14.08 |

FOREIGN PATENT DOCUMENTS

| | | |
|---|---|---|
| WO | WO 2005/048600 A1 | 5/2005 |
| WO | WO 2008/101117 A1 | 8/2008 |

OTHER PUBLICATIONS

U.S. Appl. No. 29/313,109, filed Dec. 8, 2008, Roed, et al.
U.S. Appl. No. 12/575,226, filed Oct. 7, 2009, Hagen.

* cited by examiner

VIDEO CONFERENCING APPARATUS AND METHOD FOR CONFIGURING A COMMUNICATION SESSION

RELATED APPLICATIONS

This application claims priority under 35 U.S.C. §119 to U.S. Application No. 61/122,155, filed on Dec. 12, 2008, and Norwegian Application No. NO 20085194, filed on Dec. 12, 2008. The entirety of each is incorporated herein by reference.

FIELD OF THE INVENTION

This disclosure relates to video conferencing systems and telepresence.

BACKGROUND

Conventional videoconferencing systems include a number of end-points communicating real-time video, audio and/or data (often referred to as duo video) streams over and between various networks such as WAN, LAN and circuit switched networks.

A number of videoconference systems residing at different sites may participate in the same conference, most often, through one or more Multipoint Control Units (MCUs) performing switching and mixing functions to allow the audiovisual terminals to intercommunicate properly.

However, representing moving pictures requires bulk information as digital video typically described by representing each pixel in a picture with 8 bits (1 Byte). Such uncompressed video data results in large bit volumes, which is difficult to transfer over conventional communication networks and transmission lines in real time due to limited bandwidth.

Thus, enabling real time video transmission requires a large extent of data compression which may compromise picture quality. The compression of multimedia data to be transmitted, as well as the decompression of the multimedia data to be received, takes place in a processor unit conventionally referred to as a codec.

As videoconferencing involves various recourses and equipment simultaneously interoperating at different localizations and capabilities, there is also a need for the possibility to manage the resources involved both for scheduled and ad hoc videoconferences through a video conference manager tool.

Video conferencing systems provide communication between at least two locations for allowing a video conference among participants situated at each location. Conventionally, the video conferencing arrangements are provided with one or more cameras. The outputs of those cameras are transmitted along with audio signals to a corresponding plurality of displays at a second location such that the participants at the first location are perceived to be present or face-to-face with participants at the second location.

Further, the images captured by the plurality of cameras must be arranged and displayed so that they generate a non-overlapping and/or contiguous field of view, so-called continuous presence. Continuous presence is a mixed picture created from far-end sites in an MCU. For example, in case of a videoconference of five participants, each site will receive a picture divided into four quadrants with the picture captured from each of the other sites inserted in respective quadrants.

Continuous presence or several displays with only one camera prevents the feeling of eye-contact among participants in video conferencing systems. Typically, a camera is placed somewhere above the display at which a participant is observing a display of the participant from the remote station. Consequently, the camera captures the participant at an angle above and on the side of the participants viewing level or head. Thus, when an image of that participant is displayed at the remote station, it appears as if the participant is looking down or to the left or right. Previous solutions to this problem have required complex optical systems and methods using, for example, a plurality of lenses and mirrors. The solutions have usually been designed for use when the camera is capturing an image of a single participant, and they fall short when simultaneously capturing images of multiple participants.

In addition to the lack of sufficient eye-contact, there are also other limitations in conventional videoconferencing limiting the feeling of being in the same room. Continuous presence and small displays also limit the size of the displayed participants. Low capturing and display resolution and highly compressed data also contribute to a reduction of the experience of presence. Some solutions have tried to improve this by introducing so-called telepresence systems requiring dedicated high bandwidth communication lines. However, these solutions are not well suited to be connected to a conventional LAN or WLAN, and are not interoperable with conventional videoconferencing systems.

U.S. 2008/0246834 A1 (U.S. application Ser. No. 12/050,004, filed on Mar. 17, 2008) describes a communication system which addresses these issues, wherein at least two telepresence terminals, each terminal having at least one transceiver, are connected by more than one separate point-to-point connection between the separate transceivers of each of the telepresence terminals. Which transceiver in which endpoints to connect to each other, are set up when a conference is established, e.g., on a request from a control unit or from a conference manager, a master site starts transmitting instructions to the other participating telepresence systems on how to set up connections between them. The instructions are sent to the master transceiver, which in turn relays the instructions to the other transceivers in question. The instructions are typically incorporated in an open field in the message flow specifying the control protocol of establishing video conference call, such as ITU H.241, H.242 or H.243. Previous instructions schemes have been unreliable, and as such there is a need in the art of an improved method and system of establishing telepresence conference calls. U.S. 2008/0246834 A1 is incorporated in its entirety herein by reference.

SUMMARY

It is an object to provide an apparatus, system and method overcoming the above described problems.

In particular, in a first aspect, a method is provided which includes setting up communication sessions in a telepresence call between at least two telepresence systems (TPs), each TP having at least one transceiver. The information required for setting up the communication sessions is embedded in a control protocol message flow establishing a first communication session between a first transceiver of a first TP among the at least two TPs and a first transceiver of a second TP among the at least two TPs. An apparatus and computer readable medium including computer executable instructions to perform the method are also provided.

BRIEF DESCRIPTION OF THE DRAWINGS

In order to make this disclosure more readily understandable, the discussion that follows will refer to the accompanying drawings, in which.

DETAILED DESCRIPTION

In the following, aspects of the claimed invention are described with reference to a preferred embodiment, and by referring to the accompanying drawings. However, people skilled in the art will realize other applications and modifications within the scope of the invention as defined in the enclosed independent claims.

Figure 1:
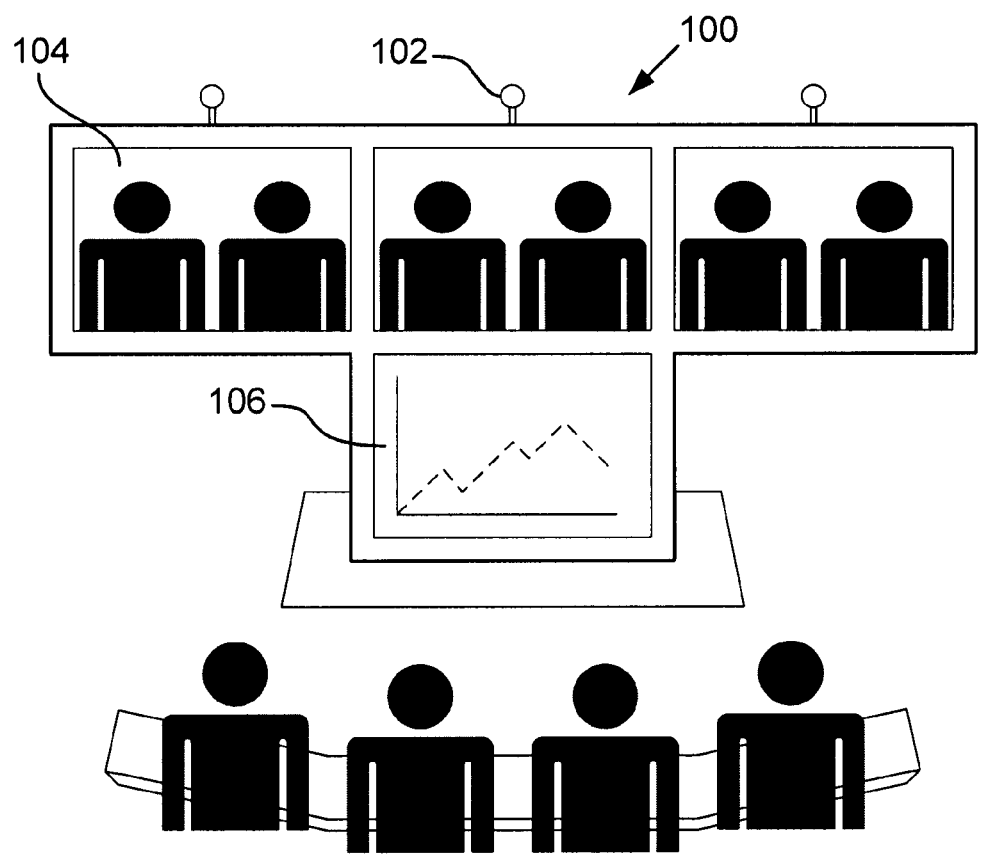
FIG. 1 shows an example of an endpoint assembly.

Described herein is a novel system for providing realistic presence of participants, or telepresence, in a videoconference by means of standard based communication. An exemplary endpoint 100 compliant with this system is shown in FIG. 1, and includes at least one codec and one camera 102 for each display 104. The displays are preferably large-scaled flat screens placed side by side with the cameras respectively placed on top of the displays.

Figure 2:
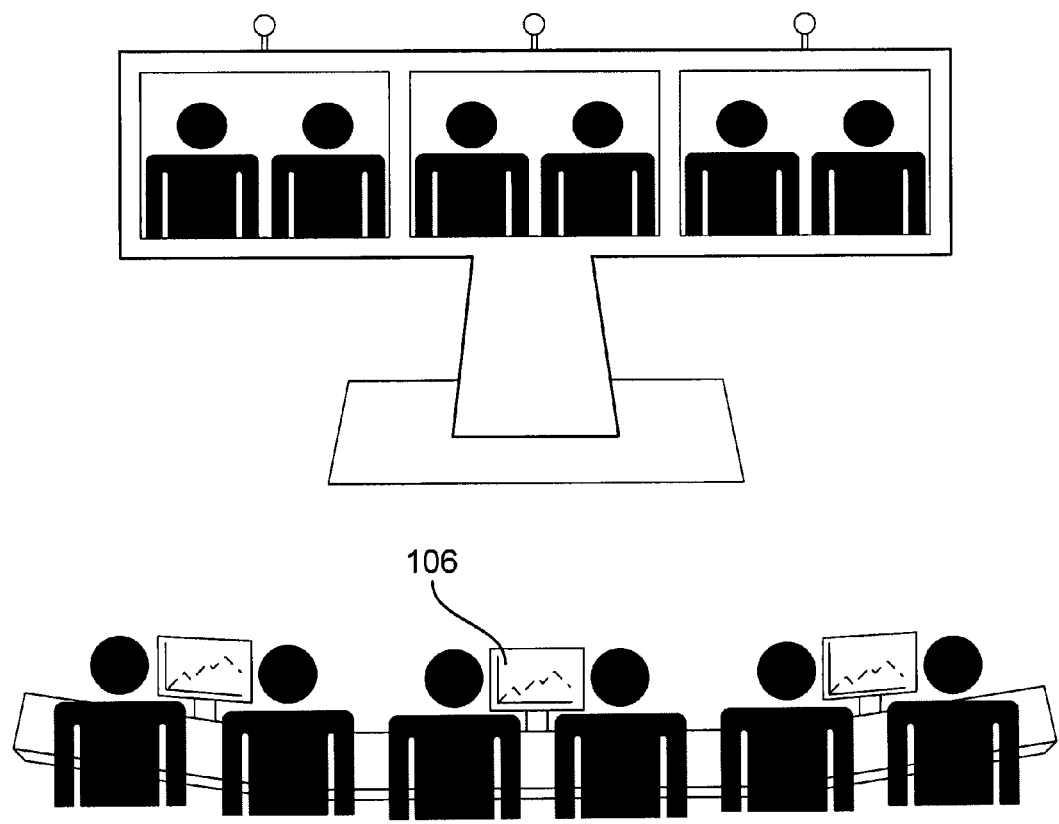
FIG. 2 shows another example of an endpoint assembly.

There is preferably also an additional display 106, e.g., placed below the other displays being reserved for data input, such as presentations and shared applications or for communicating with regular videoconferencing endpoints usually having only one camera and displaying several sites in the same display. Alternatively, the additional display 106 is replaced by several table mounted displays as shown in FIG. 2.

There is preferably also a control unit installed in an endpoint according to the present invention. The control unit has a user interface, e.g., with a pressure or touch sensitive screen (e.g., additional display 106 shown in FIG. 2), providing the user access to initiate calls in addition to all other functions and adjusting all settings that the system is capable of providing. In other words, in a preferred aspect, the table mounted additional display 106 is touch sensitive and serves both as a display screen and a control interface for the control unit. The control unit is also able to receive and execute commands from a conference manager tool, such as setting up scheduled conferences etc. The control unit is in turn connected to the other parts of the endpoint through a master device that represents the system as a whole. The master device could be a part of the control unit, or it could be one of the codecs. The master device would also be the only device registered with a conference manager.

Accordingly, telepresence in this context means a videoconference between videoconferencing endpoints, where at least one of the endpoints has at least two displays, and at least one codec and camera for each of the displays.

A telepresence compliant endpoint as described above will from now on be described as a telepresence system. As readily understandable for a person skilled in the art, a telepresence compliant endpoint might be replaced by a telepresence compliant Multipoint Control Unit (MCU), also known as a telepresence server.

Figure 3:
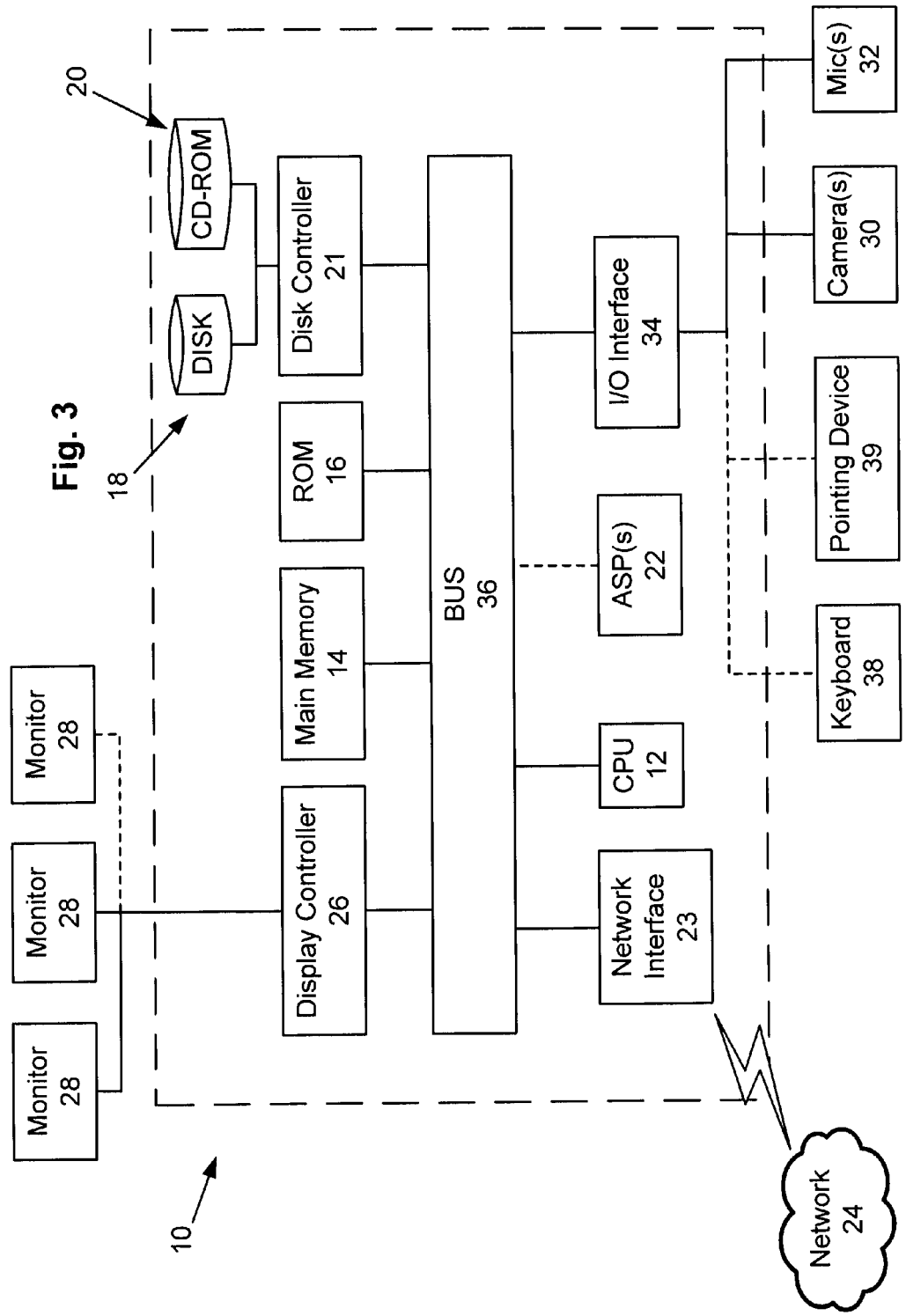
FIG. 3 shows an exemplary hardware arrangement of an endpoint assembly or an MCU.

Generally, as shown in FIG. 3, an exemplary MCU 10 includes a CPU 12, which processes data and instructions stored in memory 14 and/or ROM 16. The CPU 12 also processes information stored on the disk 18 or CD-ROM 20 through a disk controller 2. The exemplary CPU 12 may be an Intel Pentium-based processor from Intel of America. Of course, other processor and hardware vendors and types are known in the art such as Freescale ColdFire, i.MX and ARM processors from Freescale Corporation of America. Thus, instructions corresponding to the processes described herein and in accordance with exemplary aspects of this disclosure are stored on any one of the memory 14, ROM 16, disk 18, or CD-ROM ROM 20. The memory 14 may include random access memory (RAM), flash memory, EEPROM memory, or the like, while the ROM 16 is read-only memory, such as PROMs; the disk 18 is a hard disk drive, a solid state drive, or a combination thereof; and the CD-ROM drive 20 preferably includes DVD functionality.

In some aspects, the MCU 10 includes an application-specific processor (ASP) 22, which is preferably a programmable processor. The ASP 22 is configured to perform video compression and/or decompression. For example, the ASP 22 is a MPEG-based codec. Alternatively, the MCU 10 includes computer-readable instructions which enable the CPU 12 to compress and/or decompress video.

The MCU 10 also preferably includes a network interface 23, such as a an IEEE 802.x compliant network controller, for interfacing with the MCU 10 via a network 24 or the Internet; a display controller 26 for interfacing with displays 28, such as an LCD or plasma-based display; and cameras 30 and microphones 32 interfaced through an I/O interface 34 to a BUS 36. As discussed above, at least one ASP 22 and camera 30 is provided for each of displays 28.

In some aspects, the MCU 10 also includes a keyboard 38 and a pointing device 39 interfaced through the I/O interface 34. A description of the general features and functionality of the aforementioned components is omitted for brevity as these features are well known.

The exemplary MCU 10 shown in FIG. 3 is therefore a hardware platform of a computing device. Computer-readable instructions can be stored on any one of the aforementioned disk drives or memory devices, including the disk 18 and the ROM 16. Computer readable-instructions may also be provided as a utility application, background daemon, or component of an operating system, or combination thereof, executing in conjunction with CPU 12 and an operating system such as UNIX, Solaris, LINUX and other systems known to those skilled in the art. Further, it should be appreciated the structural hardware relationships depicted in FIG. 3 can be alternatively arranged as one skilled in the art will readily appreciate.

Figure 4:
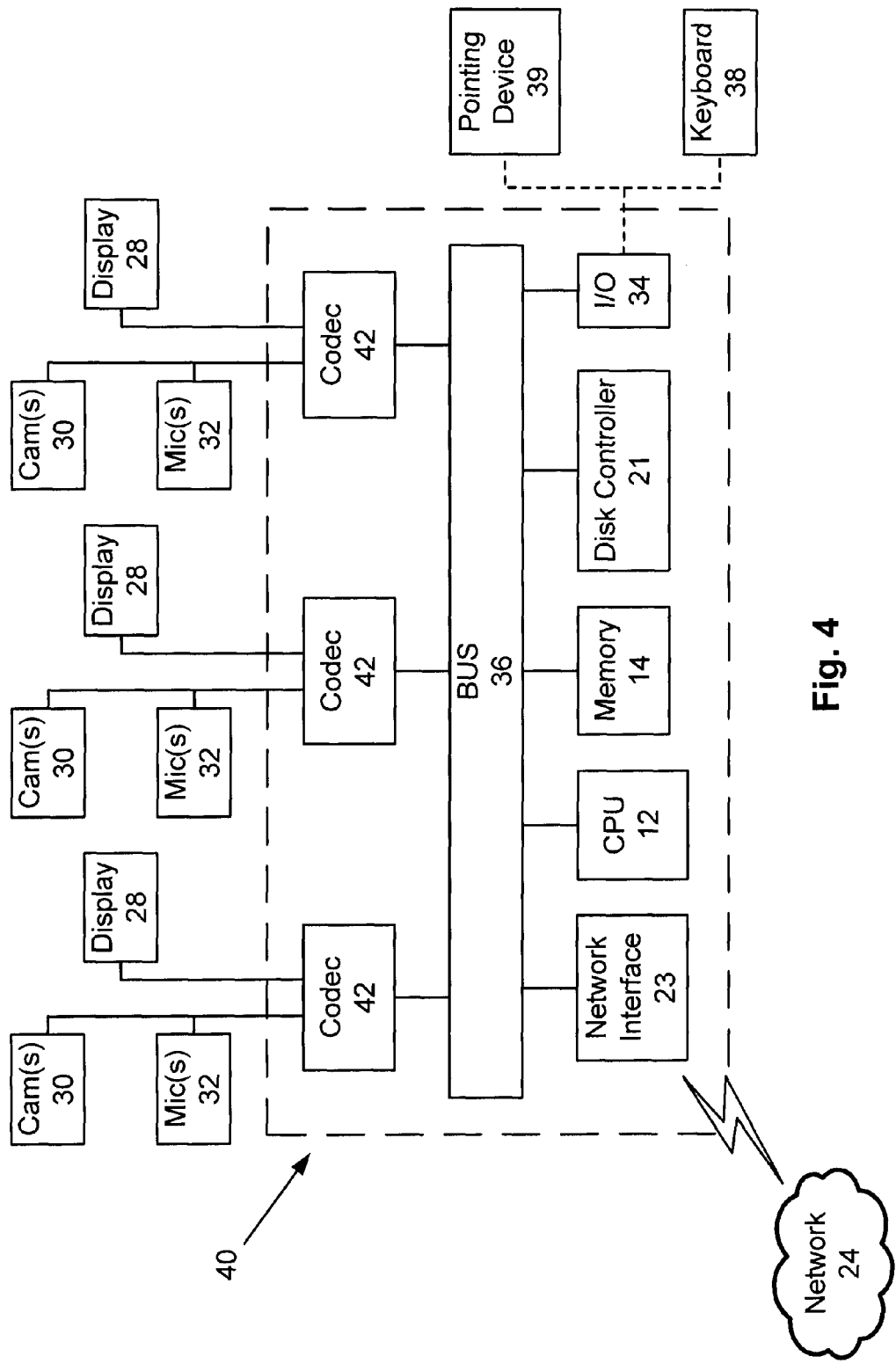
FIG. 4 shows an exemplary telepresence apparatus.

For example, as shown in FIG. 4, a telepresence apparatus 40 is shown to include components and a configuration similar to the aforementioned MCU 10 shown in FIG. 3. The telepresence apparatus 40, however, shows each of displays 28 and respective camera(s) 30 and microphones 32 connected to a respective codec 40, which is a device for encoding and decoding (compressing/decompressing) audio and visual data. The codecs 40 are then interconnected to the BUS 36 and operation thereof is similar to the MCU 10 shown in FIG. 3.

It should be appreciated the codec(s) 40 preferably includes circuitry and computer readable instructions to convert audio data from the microphone(s) 32 and video data from the camera(s) 30 to compressed audio and video data, including data compliant with an MPEG protocol, for transmission through the network 24. One skilled in the art should appreciate other protocols can be implemented.

Additionally, the codec(s) 40 also preferably decompress or de-convert data received form the network 24 to be rendered on the display(s) 28. To this effect, the display(s) 28 also preferably include speakers (not shown) for rendering audio signals which have been decompressed by the codec(s) 42. However, it should be appreciated external speakers and amplification systems (not shown) could be used without detracting from the scope of this disclosure.

A conference between telepresence systems is arranged by setting up site-to-site connections between respective codecs of the endpoints, even if the conference is a multi-site conference. Which codecs in which endpoints to connect to each other, are selected to optimize the feeling of presence for the participants in the conference. As an example, when the codec associated with the right camera and the right screen of site A in a conference is directly connected in a video conference link to the codec associated with the left camera and the left screen of site B, the participants of site A will experience that the participants of site B turn to them when the participants of site B look at the left screen where the participants of site A are displayed. Examples on how this will effect the selection of connection paths in different conference constellations are discussed further below.

According to one aspect, when a conference is established, the one telepresence system initiating the conference is selected as the master site. The master site controls the other telepresence systems in the conference keeping track of status, controlling the establishment of the conference and rearranging the communication links when a telepresence system joins or leaves during the conference.

When a conference is to be established, e.g., on a request from the control unit or from a conference manager, a first call is established from a first master device of a first telepresence system to a second master device of a second telepresence system. Within the first call the master device and the second master device exchange information, such as the addresses of the other devices, needed to setting up the site-to-site connections between respective codecs of the telepresence systems.

The information are preferably incorporated in an open field in the message flow specifying the control protocol of establishing video conference call, in particular the vendor specific messages of the ITU H.245 protocol.

Figure 5:
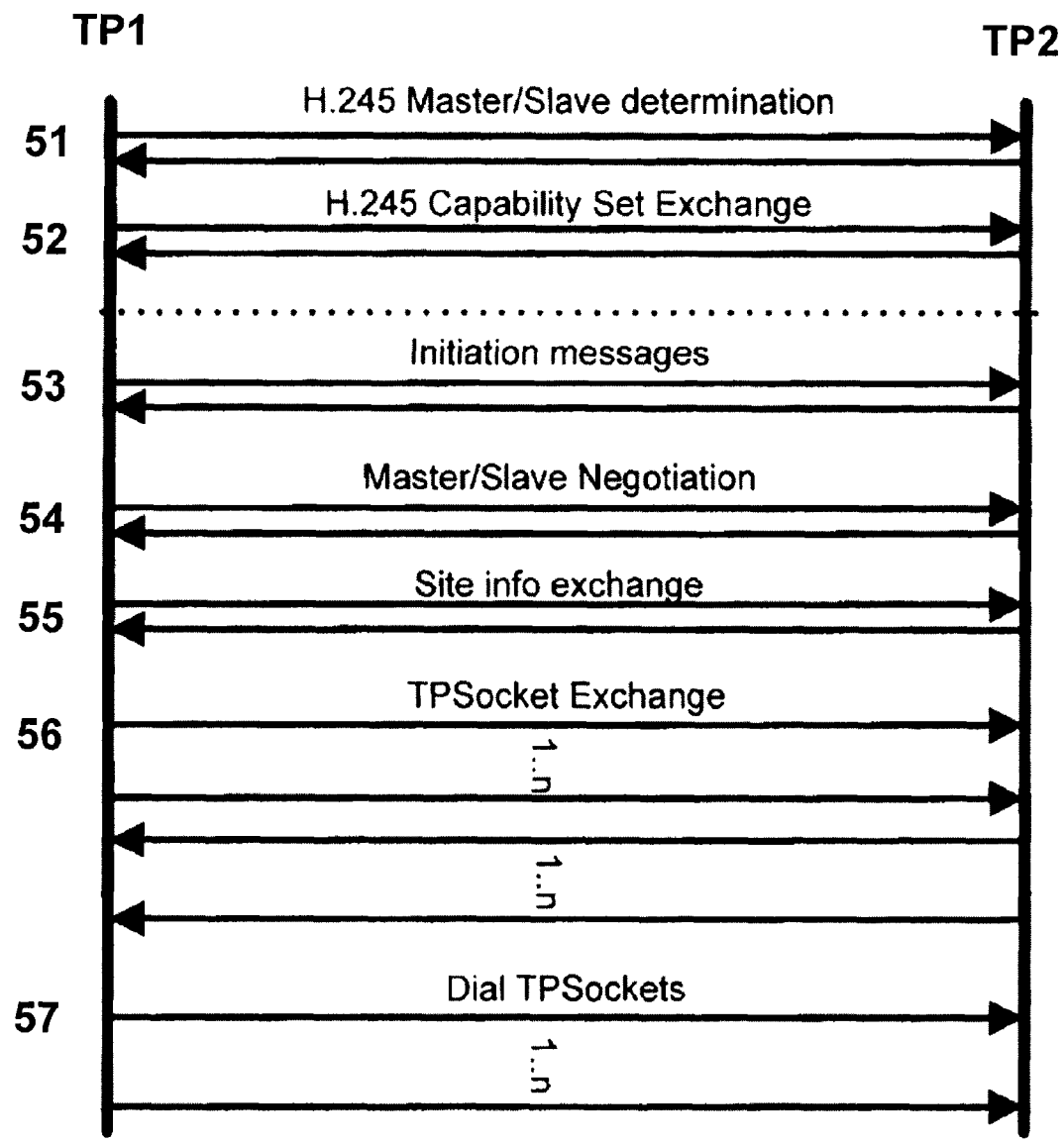
FIG. 5 shows an exemplary message flow between a first telepresence system and a second telepresence system.

An exemplary message flow according to a method of this disclosure is shown in FIG. 5, wherein a first telepresence system (TP1) is initiating a telepresence call to a second telepresence system (TP2). The first step of the telepresence call (not shown) is to establish a first H.323 call between the master device of TP1 and TP2. When the first H.323 call is established, a first H.245 channel is also established, either directly or proxied via at least one gatekeeper, between the respective master device of TP1 and TP2. In step 51 the master devices performs a Master/Slave determination, and in step 52 the master devices exchanges the capability sets of the master devices. After steps 51 and 52 are completed, it is possible to transmit vendor specific messages using the H.245 protocol.

In step 53, the master device of TP1 starts transmitting a first initiation message, or hello message, identifying itself as a telepresence system, to the master device of TP2. The master device of TP2, after receiving the first initiation message from TP1, transmits a second initiation message also identifying itself as a telepresence system to TP1. In addition to the value indicating a telepresence system the initiation message also comprise a determination number and the version of the protocol being used. The determination number will be described further below with reference to step 54, Master/Slave negotiation. In addition, the initiation message can preferably also include the number of screens in the telepresence system.

The master device initiating the telepresence call, i.e. TP1, selects a determination number in a first range, the device receiving the initiation message then selects a determination number in a second range, wherein the second range comprise numbers of lower values than the first range. Preferably the first range is <32768-66635>, and the second range is <0-32767>. The telepesence system with the highest value is determined to be the master, and accordingly the telepresence system with the lowest value is the slave. In step 54, TP1 transmits a first acknowledgement (ACK) message to TP2 confirming that TP1 is the master. After receiving the first ACK message, TP2 transmits a negative ACK message to TP1 confirming that TP2 is not the master.

In step 55, the master device of TP1 transmits a first SiteInfo message to the master device of TP2. After receiving the first SiteInfo message, the master device of TP2 transmits a second SiteInfo message to the master device of TP1. The SiteInfo message comprises the name of the system, the type of the system and the number of any additional devices, or telepresence sockets, which is to be connected.

In step 56, the master device of TP1 transmits a first number of TPSocket-messages to the master device of TP2, the number of TPSocket-messages corresponding to the number of telepresence sockets in TP1. After receiving the first number of TPSocket-messages, the master device of TP2 transmits a second number of TPSocket-messages to the master device of TP1, the number of TPSocket-messages corresponding to the number of telepresence sockets in TP2. The TPSocket-message comprises the position of a socket relative to the position of the corresponding master device, and the number to be called to reach the socket.

In step 57, the telepresence sockets (TPSockets) of TP1 establish communication sessions with the TPSockets of TP2, by using normal H.323 procedures.

In another exemplary embodiment, the message flow also includes messages to send or request modes of operations of the telepresence conference. Some exemplary modes of operation are described below.

In yet another exemplary embodiment, the message flow also includes messages to invite more sites into the conference.

According to an exemplary aspect, the messages are sent using the following format:

prefix, command: $key_1$='$value_1$' . . . $key_n$='$value_n$' prefix, e.g. TTPP, is preferably used to identify the protocol. However, as readily understandable by a person skilled in the art, prefix can be omitted if not required in a specific application without detracting from the scope of this disclosure. Exemplary commands, or message identifiers, and their associated keys and values are described below.

The initiation message described above in relation with step 53 is identified with Experia. The Experia message indentifies the transmitting system as a telepresence system. The Experia message also contains at least two key values: determinationNumber and Version. The determinationNumber value is a number within a first or a second range of numbers, wherein the second range includes numbers of lower values than the first range. The telepresence system initiating a call will assign itself as master by choosing a number from the first range. Accordingly, the receiving telepresence system chooses a number from the second range when transmitting the Experia message. Preferably the first range is <32768-66635>, and the second range is <0-32767>. The Version value is the version of the protocol. Preferably the Experia message also contains a Screen-value that identifies the number of screens of the system transmitting the message. An exemplary Experia message is shown below:

TTPP, Experia: determinationNumber=66635 Version=1 Screens=3

The acknowledgement message described in relation with step 54 is identified with ExperiaAck. The ExperiaAck message has one key value: iAmMaster. The iAmMaster value is a Boolean telling the status of the master/slave negotiation as described above. A system with a determination number in the first range transmits a "True" value, while a system with a determination number in the second range transmits a "False" value. An exemplary ExperiaAck message is shown below:

TTPP, ExperiaAck: iAmMaster=true

The SiteInfo message described in relation with step 55 is identified with SiteInfo. The SiteInfo message has three key values: Name, Type and tpSockets. The Name value is the name of the system transmitting the message, and can be any chosen name. The Type value identifies what type of system is transmitting the message. The Type values are predefined values for known telepresence compatible systems, e.g. TANDBERGExperiaT3 identifies a TANDBERG T3 telepresence endpoint and CodianTPS identifies a TANDBERG Codian Telepresence server. The tpSockets value gives the number of any additional devices, or telepresence sockets, to be connected for each telepresence system. An exemplary SiteInfo message for a three screen TANDBERG T3 telepresence system is shown below:

TTPP, SiteInfo: Type=TANDBERGExperiaT3 name=A, tpSockets=2

The TP-Socket messages described above in relation with step 56 is identified with TPSocket. The TPSocket message has at least three key values: xPos, yPos and number. The number value is the number the master device will be calling to reach the telepresence socket. Preferably, the TPSocket message also includes a protocol value identifying the relevant communication session protocol, default value being H.323. The xPos and yPos values gives the respective horizontal and vertical position of the telepresence socket in relation to the centre socket, 0 is the centre position. Exemplary TPSocket messages for a three screen telepresence system where all screens are in the same horizontal plane, is shown below:

TTPP, TPSocket: xPos=−1 yPos=0 number=ALeft@tandberg.com
TTPP, TPSocket: xPos=1 yPos=0 number=ARight@tandberg.com In another aspect according to this disclosure, the telepresence systems select a mode of operation from a predefined set of camera presets, by a transmitting a Conference message. The Conference message is preferably transmitted as a part of the site info exchange in step 55. The Conference message is transmitted from the site that owns the conference. The conference owner can be different from the master of the conference. The conference owner is the site that is the master of a multisite conference, i.e. a telepresence server will own the conference if multiple telepresence systems is connected to the telepresence server. Similarly, a TANDBERG T3 telepresence system will own the conference if multiple endpoints are connected to the T3 system. When the call is set up, the other endpoints or telepresence systems may request the conference owner to change the camera preset by transmitting a CameraPresetRequest message to the conference owner. If the conference owner decides to follow the request, the conference owner replays by transmitting a Conference message. The Conference message and the CameraPresetRequest message both have one key value, namely cameraPreset. The cameraPreset values are predefined camera preset values, e.g. p2p2p (Point to point, two person zoom), ot4p (One table, four person zoom), ot2p (One table, two person zoom), p2p3p (Point to point, three person zoom) and ot6p (One table, six person zoom). An exemplary Conference message is shown below:

TTPP, Conference: cameraPreset=ot4p

Figure 6:
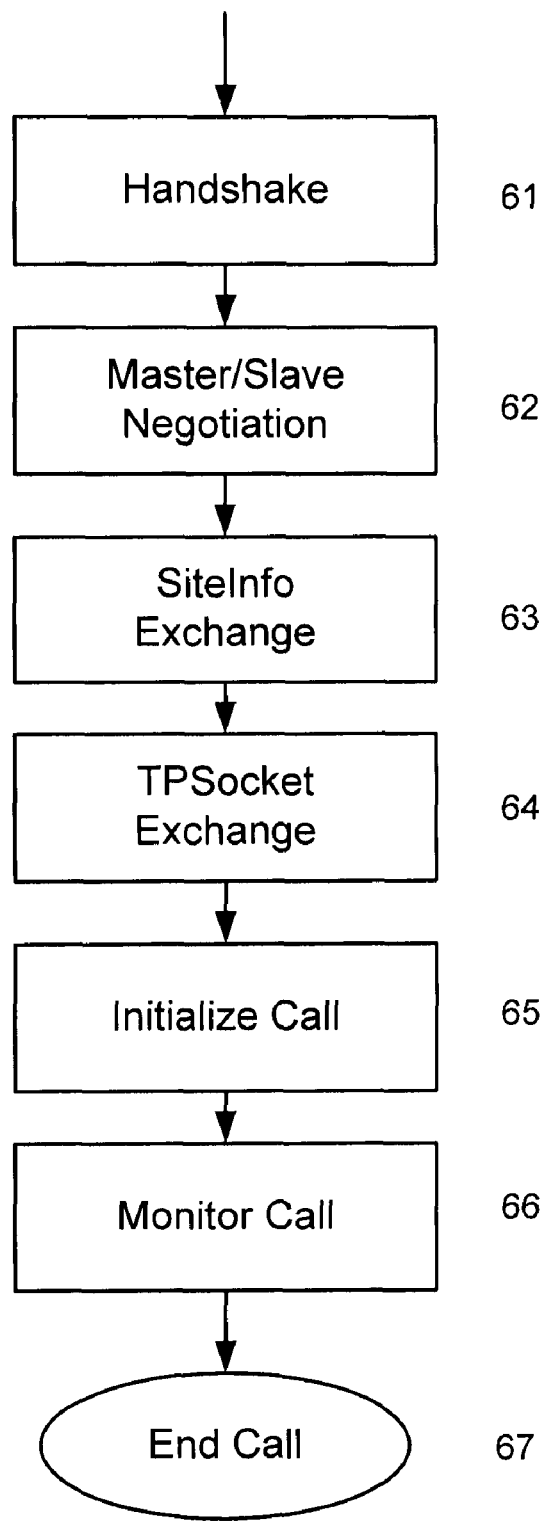
FIG. 6 shows a state diagram for a method.

In yet another aspect according to the present invention, the master device invites additional sites during an ongoing telepresence conference, by transmitting an Invite message. Invite message have two key values: number and protocol. The number value is the number the master device will be calling to reach the invited site to be invited. The protocol value is identifying the relevant communication session protocol, e.g. SIP or H.323, used for this call by the master device. The receiving master device will respond by transmitting an InviteResult message, the Invitemessage having one key value: status. If the invite is successful the status value is OK, on the other hand if the invite is not successful the status value is Error followed by an corresponding error message. An exemplary invite message exchange is show below:

TTPP, Invite: number=newsite@domain.com protocol=sip
TTPP, InviteResult: status=Error errorMessage As described above, and shown in FIG. 6, the first step of a method according to this disclosure is an initiation step, or a handshake state, step 61. During the handshake state the master device of a first telepresence system transmits a first message, identifying the first telepresence system as a telepresence system, to a master device of a second telepresence system. On receiving the first message, the master device of the second telepresence system transmits a second message, the second message identifying the second telepresence system as a telepresence system. The first and second messages respectively also include additional information about the respective telepresence system, such as a determination number, the version of a protocol and the number of screens of the system. The master device initiating the telepresence call selects a determination number in a first range, the device receiving the initiation message then select a determination number in a second range, wherein the second range comprise numbers of lower values than the first range. Preferably the first range is <32768-66635>, and the second range is <0-32767>.

In the Master/Slave Negotiation state, step 62, the master devices of the telepresence systems determine which of the two telepresence systems should be the master of the call between the two telepresence systems. The telepresence system with the highest value is determined to be the master, and accordingly the telepresence system with the lowest value is the slave. The first master device transmits a first acknowledgement message to the second master device confirming that the first telepresence system is the master of the call. After receiving the first acknowledgement message, the second master device transmits a negative acknowledgement message to the first master device confirming that the second telepresence system is not the master.

In the SiteInfo Exchange state, step 63, each of the telepresence systems transmits a message to the other telepresence system comprising the name of the telepresence system, the type of telepresence system, and the number of additional devices to connect, or tpSockets, to setup the telepresence call. Preferably, during the SiteInfo Exchange state the telepresence systems select a mode of operation from a predefined set of camera presets, by a transmitting a Conference message as described above.

In the TPSocket Exchange state, step 64, each of the telepresence systems transmits a TPSocket message for each of the tpsockets available in the telepresence system. The TPSocket message includes at least the horizontal and vertical position of the tpsocket in relation to the master device of the system, and the number or address to be called to connect to the tpsocket. Each telepresence systems checks that a TPSocket message is received for the number of tpSockets received in the SiteInfo message, then the method proceeds to Initialise Call state.

In the Initialize Call state, step 65, the master telepresence system dials the tpSockets as specified in the TPSocket messages. The tpSockets receiving a call answer from an expected call, i.e. a call from a socket identified in one of the TPSocket messages, and rejects calls from any other callers. Then, a user of the system can preferably request a new camera preset by transmitting a camera preset request message as disclosed above.

After the Initialize Call state, step 65, the method proceeds to the Monitor Call state, step 66. The master device of the master telepresence system in the call monitors the different tpSockets in the call and keeps track of the status of the conference and the different connections, then being able to re-establish or rearrange the connections if necessary. When the call controlling the telepresence call, i.e. the initial call between the master devices of the two telepresence systems, is dropped, all other tpSockets calls will be dropped and the telepresence conferece is ended, i.e. step 67. On the other hand, when one of the other tpSocket calls is dropped, the master device re-establishes the call.

Moreover, any processes, descriptions or blocks in flow charts should be understood as representing modules, segments, portions of code which include one or more executable instructions for implementing specific logical functions or steps in the process, and alternate implementations are included within the scope of the exemplary embodiment of the present invention in which functions may be executed out of order from that shown or discussed, including substantially concurrently or in reverse order, depending upon the functionality involved, as would be understood by those skilled in the art.

Obviously, numerous modifications and variations of the present invention are possible in light of the above teachings. It is therefore to be understood that within the scope of the appended claims, the invention may be practiced otherwise than as specifically described herein.

The invention claimed is:

1. A method of setting up communication sessions in a telepresence call between at least a first and a second telepresence (TP) system, each TP system having at least one transceiver, wherein information required for setting up the communication sessions is embedded in a control protocol message flow establishing a first communication session between a first transceiver of the first TP system and a first transceiver of the second TP system, the method comprising:
    transmitting a first message from the first transceiver of the first TP system to the first transceiver of the second TP system, the first message defining a TP call;
    transmitting a second message from the first transceiver of the first TP to the first transceiver of the second TP system, the second message defining one of the TPs as a master TP system of the TP call;
    transmitting a third message from the first transceiver of the first TP system to the first transceiver of the second TP system and a fourth message from the first transceiver of the second TP system to the first transceiver of the first TP system, wherein the third and the fourth messages include data instructions that respectively include the number of additional transceivers (sockets), addresses of the sockets, and positions of the sockets relative to the first transceiver of the TP from which it is transmitted; and
    initializing the telepresence call from the master TP system, including instructing the sockets associated with the master TP system to set up point-to-point communication sessions with corresponding sockets associated with other TP systems, which are not defined as the master TP system, based on the data instructions included in the third and fourth messages that respectively include the number of additional transceivers (sockets), the addresses of the sockets, and the positions of the sockets relative to the first transceiver of the TP from which it is transmitted.

2. The method according to claim 1, wherein the first message includes a first number selected by the first transceiver of the first TP system from a first range of numbers, the method further comprising:
    transmitting a fifth message from the first transceiver of the second TP system to the first transceiver of the first TP system, the fifth message including a second number selected by the first transceiver of the second TP system from a second range of numbers, the second range of numbers including numbers having values lower than the first range of numbers, and
    defining the TP system transmitting the highest number as the master TP system of the TP call.

3. The method according to claim 1, wherein the message defining one of the TP systems as the master TP of the TP call includes an acknowledgement (ACK) message, the ACK message being either positive if the transmitting TP system is the master TP system of the TP call, or negative if the transmitting TP system is not the master TP system of the TP call.

4. The method according to claim 1, wherein the positions of the sockets include relative vertical positions and relative horizontal positions.

5. The method according to claim 1, the method further comprising:
    selecting a mode of operation of the TP call from a predefined set of camera presets; and
    transmitting a first TP call configuration message from the master TP system to the other TP systems in the TP call to change the camera preset of the other TP systems.

6. The method according to claim 5, the method further comprising:
    transmitting a first TP call re-configuration request message from one of the other TP systems to the master TP system, the re-configuration request message requesting a change of camera presets;
    determining whether to change the camera presets, by the master TP system upon receiving the re-configuration request message; and
    transmitting a call configuration message from the master TP system to the other TP systems in the TP call to change the camera preset of the other TP systems when the master TP determines to change the camera presets in response the re-configuration request message.

7. The method according to claim 1, wherein the third and the fourth messages further include a type of TP system which is transmitting the respective message.

8. The method according to claim 7, wherein at least one of the TP systems is a telepresence compliant multipoint control unit or telepresence server.

9. The method according to claim 1, wherein at least one of the transceivers is a codec.

10. The method according to claim 1, wherein the control protocol is ITU H.245.

11. A computer-readable medium including computer-executable instructions, which are executed by a processor to perform a method of setting up communication sessions in a telepresence call between at least a first and a second telepresence (TP) system, each TP system having at least one transceiver, wherein information required for setting up the communication sessions is embedded in a control protocol message flow establishing a first communication session between a first transceiver of the first TP system and a first transceiver of the second TP system, the method comprising:
- transmitting a first message from the first transceiver of the first TP system to the first transceiver of the second TP system, the first message defining a TP call;
- transmitting a second message from the first transceiver of the first TP to the first transceiver of the second TP system, the second message defining one of the TPs as a master TP system of the TP call;
- transmitting a third message from the first transceiver of the first TP system to the first transceiver of the second TP system and a fourth message from the first transceiver of the second TP system to the first transceiver of the first TP system wherein the third and the fourth messages include data instructions that respectively include the number of additional transceivers (sockets), addresses of the sockets, and positions of the sockets relative to the first transceiver of the TP from which it is transmitted; and
- initializing the telepresence call from the master TP system, including instructing the sockets associated with the master TP system to set up point-to-point communication sessions with corresponding sockets associated with other TP systems, which are not defined as the master TP system, based on the data instructions included in the third and fourth messages that respectively include the number of additional transceivers (sockets), the addresses of the sockets, and the positions of the sockets relative to the first transceiver of the TP from which it is transmitted.

12. A telepresence (TP) apparatus, comprising:
a local transceiver;
a transmitting unit configured to initiate a control protocol message flow establishing a communication session between the local transceiver and a remote transceiver of a remote TP apparatus, including transmitting a first message from the local transceiver to the remote transceiver, the first message defining a TP call; and
a receiving unit configured to receive messages from the remote transceiver,
the transmitting unit configured to transmit a second message defining either the TP apparatus or the remote TP apparatus as a master TP apparatus of the TP call, and configured to transmit a third message from the local transceiver to the remote transceiver, and
the receiving unit configured to receive a fourth message from the remote transceiver, wherein
the third message and the fourth message include data instructions that respectively include a number of additional transceivers (sockets) included in the TP apparatus and the remote TP apparatus, addresses of the sockets, and positions of the sockets relative to, respectively, the local transceiver and the remote transceiver, and
the TP call is initialized from the master TP apparatus by instructing sockets of the master TP apparatus to set up point-to-point communication sessions with corresponding sockets associated with the non-master TP apparatus, based on the data instructions included in the third and fourth messages that respectively include the number of additional transceivers (sockets), the addresses of the sockets, and the positions of the sockets relative to the first transceiver of the TP from which it is transmitted.

* * * * *